US 8,708,153 B2

(12) United States Patent
Hufford et al.

(10) Patent No.: US 8,708,153 B2
(45) Date of Patent: Apr. 29, 2014

(54) GRAPE PROCESSING APPARATUS

(75) Inventors: David W. Hufford, Walla Walla, WA (US); Tracy McGowen, Waitsburg, WA (US); Quentin Kemph, Walla Walla, WA (US)

(73) Assignee: Key Technology, Inc., Walla Walla, WA (US)

( * ) Notice: Subject to any disclaimer, the term of this patent is extended or adjusted under 35 U.S.C. 154(b) by 0 days.

(21) Appl. No.: 13/584,984

(22) Filed: Aug. 14, 2012

(65) Prior Publication Data

US 2014/0048459 A1    Feb. 20, 2014

(51) Int. Cl.
*B07B 1/04* (2006.01)

(52) U.S. Cl.
USPC ........... 209/352; 209/358; 209/659; 209/660; 209/674; 209/917; 460/90; 460/91; 460/92; 460/93; 460/94; 460/95; 460/144; 460/145; 460/146; 460/147; 460/148

(58) Field of Classification Search
USPC ................. 209/352, 358, 659, 660, 674, 917; 460/90–95, 144–148
See application file for complete search history.

(56) References Cited

U.S. PATENT DOCUMENTS

| | | | | | |
|---|---|---|---|---|---|
| 420,966 | A | * | 2/1890 | Rose | 209/358 |
| 473,957 | A | * | 5/1892 | Pollock | 209/273 |
| 561,484 | A | * | 6/1896 | Cadwgan | 209/157 |
| 621,744 | A | * | 3/1899 | Bowden | 209/358 |
| 888,000 | A | * | 5/1908 | Conner | 209/678 |
| 984,740 | A | * | 2/1911 | Beall | 209/358 |
| 1,415,191 | A | * | 5/1922 | Parks et al. | 209/44.1 |
| 1,438,673 | A | * | 12/1922 | Trescott | 209/545 |
| 1,635,925 | A | * | 7/1927 | Carlson | 209/358 |
| 2,053,038 | A | * | 9/1936 | MacKenzie | 209/355 |
| 4,165,280 | A | * | 8/1979 | Holley | 209/245 |
| 4,561,546 | A | * | 12/1985 | Maroney | 209/586 |
| 7,591,377 | B2 | * | 9/2009 | Puda et al. | 209/358 |
| 2008/0083663 | A1 | * | 4/2008 | Zorn | 209/674 |

* cited by examiner

*Primary Examiner* — Prasad Gokhale
(74) *Attorney, Agent, or Firm* — Paine Hamblen, LLP

(57) ABSTRACT

A grape processing apparatus and method is described and which includes a screen, a cleated conveyor belt with a bottom flight and which is spaced from the screen, and a source of bunches of grapes which have associated stems, and which are fed into a predetermined space between the bottom flight of the cleated conveyor belt and the screen, and wherein the bunches of grapes move along the screen in a rolling and tumbling motion to separate the individual grapes from the associated stems, and wherein the individual grapes are collected thereafter.

25 Claims, 8 Drawing Sheets

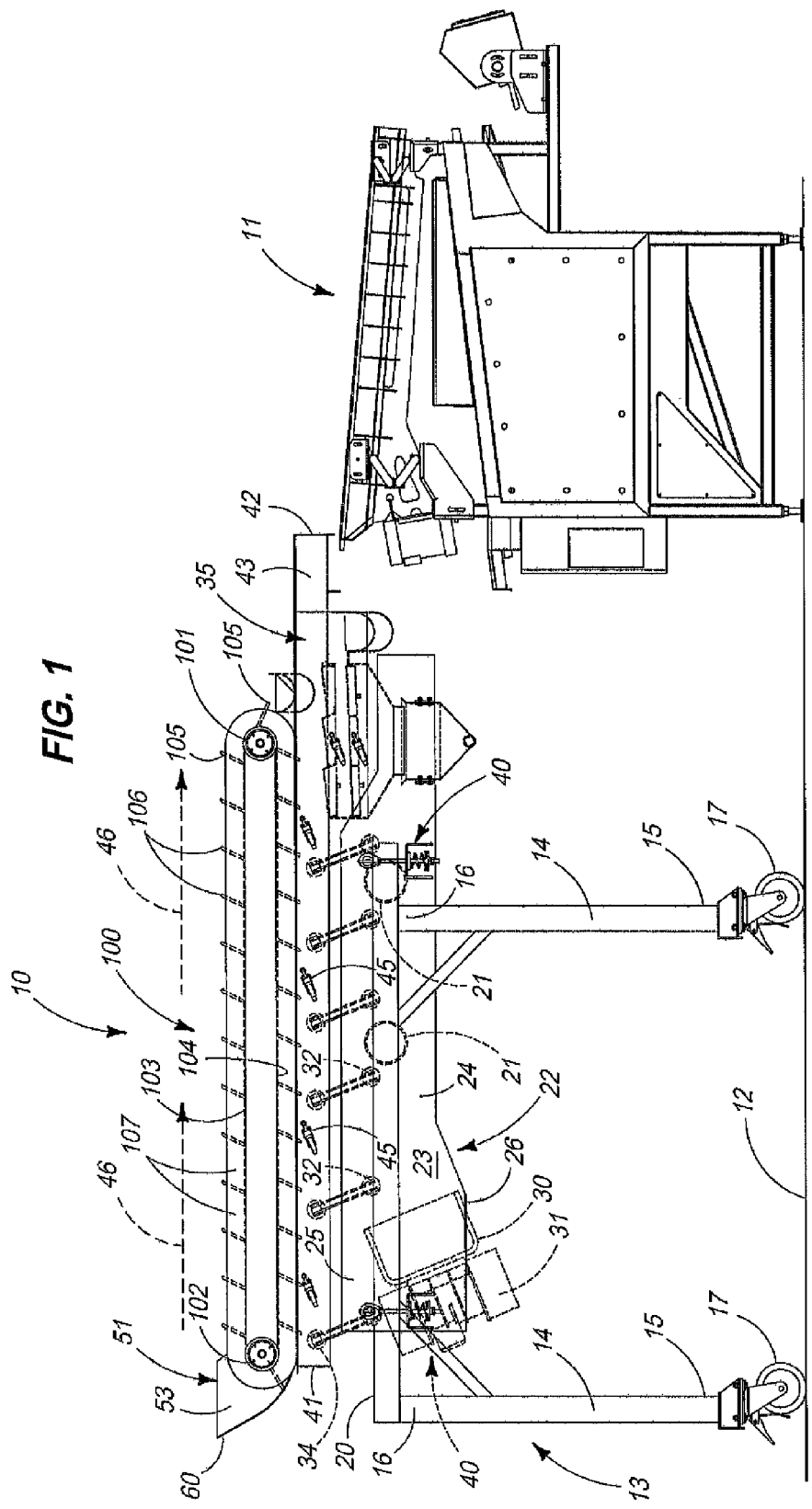

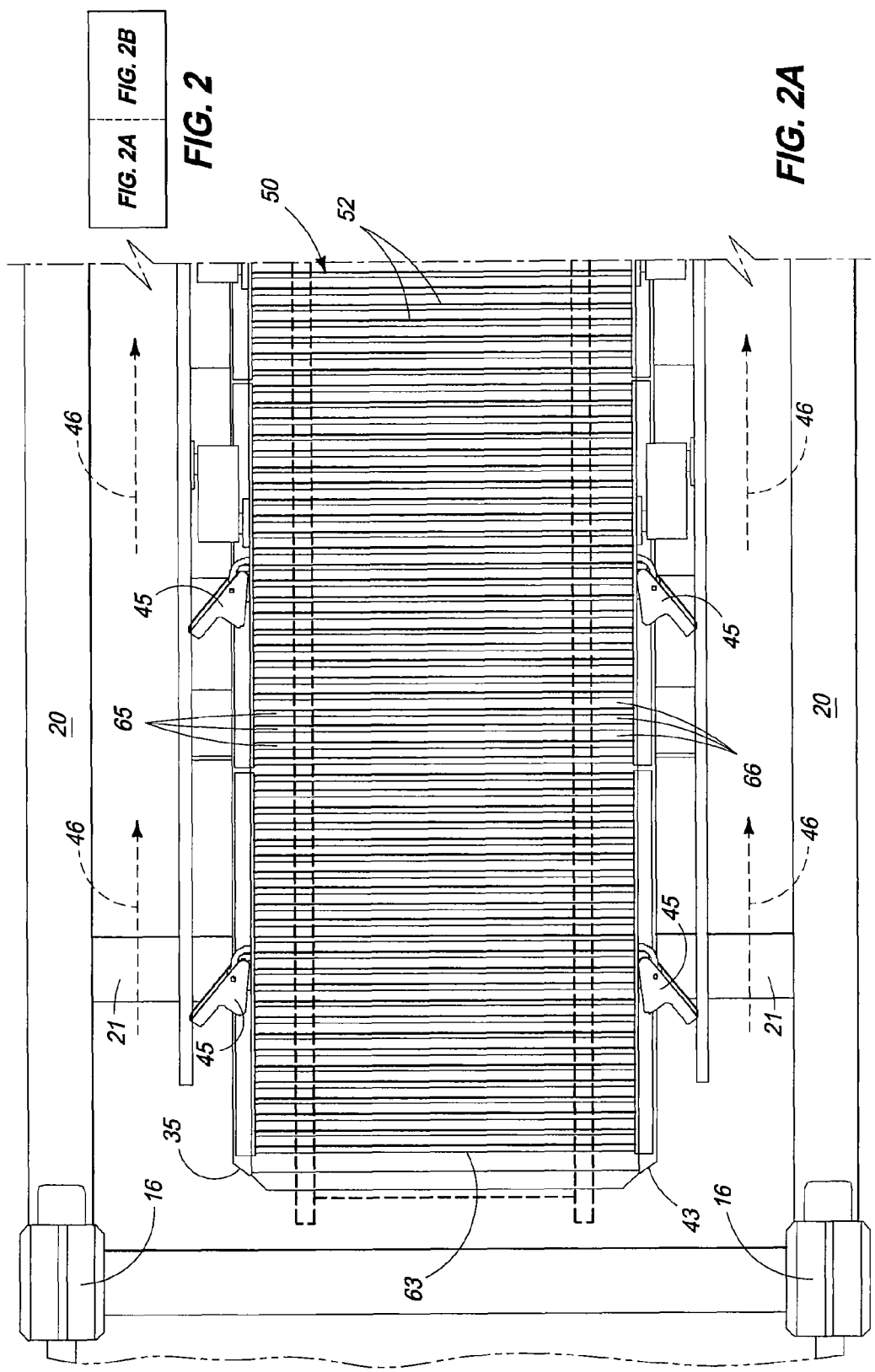

GRAPE PROCESSING APPARATUS

TECHNICAL FIELD

The present invention relates to a grape processing apparatus and method for processing grapes, and more specifically to a grape processing apparatus and method which functions to separate the individual grapes from the associated stem material in a gentle fashion so as to not injure the individual grapes during the separation process, and which further collects and transports the individual grapes for further processing.

BACKGROUND OF THE INVENTION

Various sorting devices and methodology have been developed through the years for the purposes of identifying defective produce in a stream of produce so as to provide a uniformly sorted produce stream which may be utilized for various end uses. In U.S. patent application Ser. No. 13/373,622 which was filed on Nov. 22, 2011, the teachings of which are incorporated by reference herein, a sorting apparatus is described and which has particular usefulness in sorting a stream of grapes which might be subsequently processed for use in wine production, for example. The sorting apparatus as described in this co-pending application is useful, in particular, in identifying ruptured or damaged grapes which have been separated from associated stem material and further is operable to remove non-grape substances, so-called, Material Other Than Grapes (MOG) from the stream of grapes which are being processed.

In this co-pending patent application, a prior art de-stemming apparatus comprising a drum-and-beater arrangement is employed and which separates the grapes from the stem material (MOG). The separated grapes are thereafter directed to an inspection station where they are optically inspected and then separated from MOG so as to provide a uniform final grape product stream which may be processed for wine production, and the like.

The prior art drum-and-beater de-stemmers produce a relatively large quantity of stem pieces which are known in the industry as "jacks." The production of MOG complicates the effective sorting of the resulting separated individual berries. It has been discovered, that the present prior art de-stemmer designs produce a fair amount of smashed, or split grapes which are considered to be a lost product. In prior art practices, the smashed/split grapes, and jack stems are removed mechanically, typically with vibrating screens or in the case of the above-identified earlier filed pending U.S. application are removed optically. It has been discovered that these two defects, that being the split grapes, and large numbers of jack-stems may tend to cause optical sorting problems during the sorting process, and therefore as a result, good grape product is often lost during the separation process. Therefore, high density product passing through the inspection station will typically result in ejected good product along with defective products. In the prior art drum-and-beater arrangement, the device literally beats the individual berries off of the stem. The high speed rotation of the beater also tends to impact the individual grapes producing many split-skin berries. This same impact of the beaters often breaks the main stem into smaller pieces which then have to be removed by the sorting station which is positioned downstream from the de-stemmer. This high concentration of split grapes, and jacks (MOG) suggests that the prior art drum-and-beater de-stemmer designs are aggressive in their material handling qualities, and therefore produces a needless amount of defective downstream product.

A grape processing apparatus and method which avoids the detriments individually associated with the prior art devices employed heretofore for separating grapes from their associated stem material is the subject matter of the present patent application.

SUMMARY OF THE INVENTION

A first aspect of the present invention relates to a grape processing method which includes providing a screen having a top surface which defines a multiplicity of apertures having a given size; providing a cleated conveyor belt having a bottom flight which is spaced a predetermined distance from the top surface of the screen; and supplying a source of bunches of grapes having both individual grapes which are attached to associated stems, and which is fed into the predetermined space defined between the bottom flight of the cleated conveyor belt and the screen, and wherein the bottom flight of the cleated conveyor belt moves the individual bunches of grapes along the screen in a rolling and tumbling action to separate the individual grapes from the associated stems, and wherein the individual grapes pass through the multiplicity of apertures which are defined by the screen for collection.

A further aspect of the present invention relates to a grape processing method which includes providing a vibratory conveyor having a supporting, conveying surface which reciprocates, so as to cause a source of harvested and individual grapes to move along a given path of travel, and wherein the source of harvested individual grapes are derived from individual bunches which include both a multiplicity of individual grapes and associated stems attached to the grapes; providing a screen, defining a multiplicity of apertures, and which is mounted on the vibratory conveyor, and which is further located in spaced relationship relative to the supporting, conveying surface of the vibratory conveyor, and which additionally reciprocates in unison with the supporting conveying surface; and providing a cleated continuous conveyor belt and positioning the cleated continuous conveyor belt in spaced, at least partially covering relationship over the screen and which is mounted on the vibratory conveyor, and wherein the cleated continuous conveyor belt has a top flight, and a bottom flight which is located in spaced relation relative the screen; and depositing the source of the harvested bunches of grapes are first deposited on the top flight, and then secondly depositing the bunches of grapes onto the screen, and wherein the respective cleats on the bottom flight of the cleated continuous conveyor belt forcibly move the harvested bunches of grapes along the reciprocating screen in a rolling and tumbling action which facilitates the separation of the respective grapes from the associated stems, and further causes the separated grapes to pass through the apertures defined by the screen, and be received on the supporting, conveying surface of the vibratory conveyor for transport along the path of travel for collection.

These and other aspects of the present invention will be discussed in greater detail hereinafter.

BRIEF DESCRIPTION OF THE DRAWING

Preferred embodiments of the present invention are described, below, with reference to the following accompanying drawings:

FIG. 1 is a side elevation view of the present invention employed in combination with the sorting apparatus as described in U.S. patent application Ser. No. 13/373,622.

FIG. 2(A) is a fragmentary top plan view of the grape processing apparatus of the present invention.

DETAILED DESCRIPTION OF THE PREFERRED EMBODIMENTS

Figure 2B:
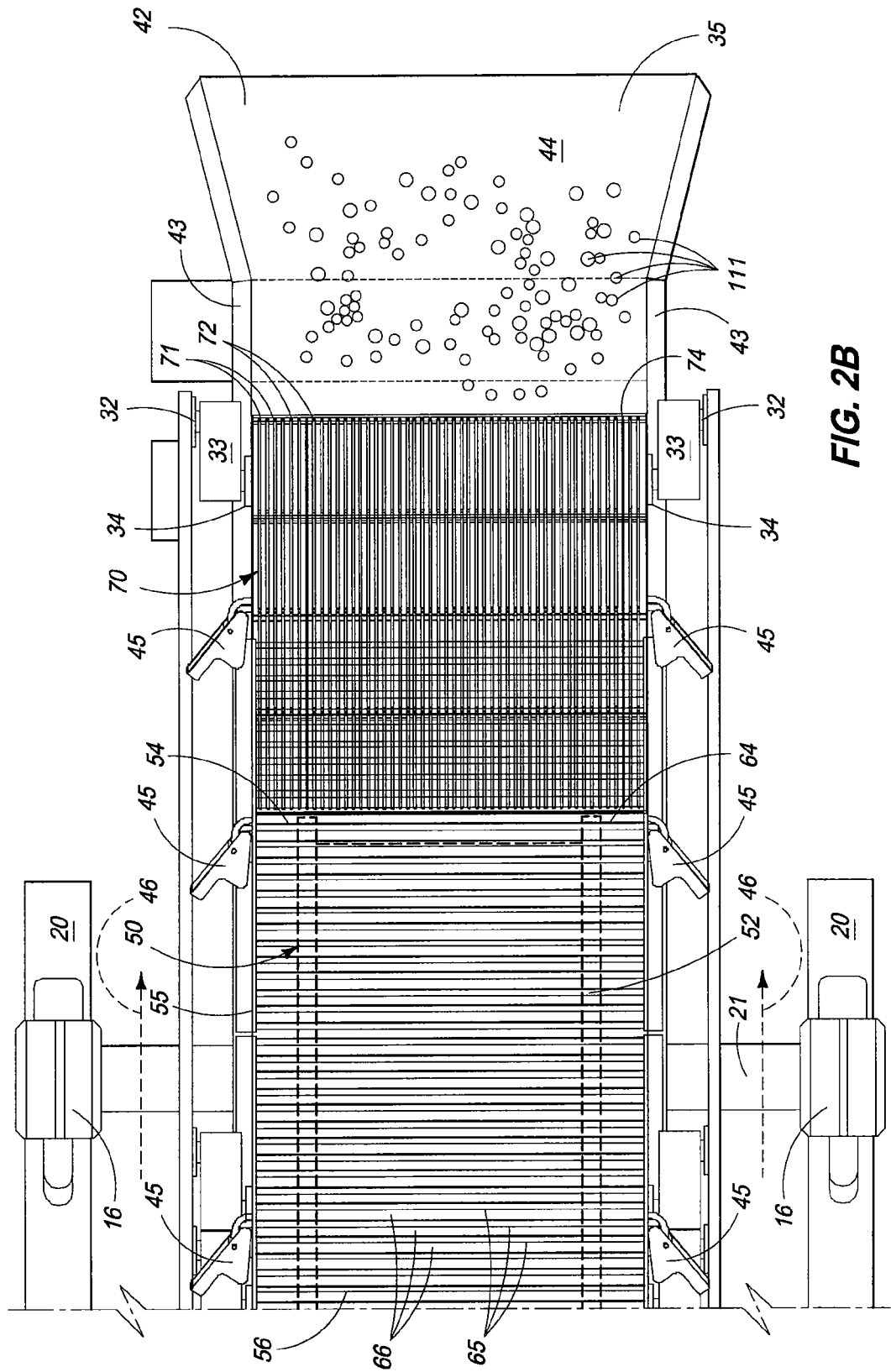
FIG. 2(B) is a partial, fragmentary, top plan view of the grape processing apparatus of the present invention.

This disclosure of the invention is submitted in furtherance of the constitutional purposes of the U.S. Patent laws "to promote the progress of science and useful arts." (Article I, Section 8).

A grape processing apparatus and related method of the present invention is generally indicated by the numeral 10 in FIG. 1 and following. As will be understood from a study of the drawings, the present invention and methodology 10 is useful when utilized in combination with a sorting apparatus which is generally indicated by the numeral 11, and which is more fully described in U.S. patent application Ser. No. 13/373,622 and which was filed on Nov. 22, 2011. The features of this sorting apparatus 11 are not discussed in further detail, hereinafter, for purposes of brevity. However, it should be understood that the sorting apparatus and associated methodology 11 is employed to sort individual berries or grapes that are provided to it, and to further remove undesirable produce and material other than grapes [MOG] from the resulting produce stream which is delivered to it. The present grape processing apparatus 10 for implementing the methodology is supported in spaced relation relative to the surface of the earth, or other underlying supporting surface 12. The sorting apparatus 11 is held in spaced relation relative to the underlying supporting surface or surface of the earth 12 by a multiplicity of vertically disposed legs 14 only two of which are seen in that view. The multiplicity of vertically oriented legs each has a first end 15, and an opposite second end 16. As seen in FIG. 1, individual rollable casters 17 are mounted on the first end 15 of each of the vertical legs 14, and which permits the grape processing apparatus 10 to be easily moved around and positioned appropriately relative to the downstream sorting apparatus 11 which is more fully described in U.S. patent Ser. No. 13/373,622 which was filed on Nov. 22, 2011. Again, this prior co-pending U.S. patent application, and its teachings, are incorporated by reference herein.

Referring still to FIG. 1 it will be seen that the grape processing apparatus 10, and more specifically the supporting frame 13 further includes a horizontally disposed support beam 20 which extends between, and is affixed to, the respective vertically disposed legs 14. As such, the horizontal support beam provides a rigid frame upon which other assemblies of the grape processing apparatus 10 may be mounted. More specifically, the base portion 22 of a vibratory conveyor, as will be described below, is mounted on the support frame 13 as defined by the multiplicity of legs 14 and the horizontal support beam 20. In particular, the base portion of the vibratory conveyor 22 is held in spaced relation relative to the underlying supporting service 12 by a pair of transversely disposed support beams 21 which are affixed by welding, or the like, to the horizontal support beam 20, and which further extend transversely of the supporting frame 13. The base portion of the vibratory conveyor 22 additionally has individual side portions, 23, which are affixed to the transverse support beams 21 as seen in FIG. 1. The side portions 23 are defined in part by a sidewall 24 which has a top peripheral edge 25, and a bottom peripheral edge 26. Still referring to FIG. 1, it will be seen that extending between the opposite sidewalls 24 is a motor mount which is generally indicated by the numeral 30. The motor mount is of traditional design and which supports a motor 31 which is operable to impart vibratory force along a line of force which extends substantially through the center of mass of the overhead vibratory conveyor bed which will be discussed in greater detail, below. Additionally, as seen in FIG. 1, lower spring arm mounting fixtures 32 are fastened at predetermined distances near the top peripheral edge 25 of the respective sidewall 24. The individual lower spring arm mounting fixtures 32 receive or secure, a pair of spaced, spring arms 33 (FIG. 2B) of traditional design. The pair of spring arms extend in a non-vertical orientation upwardly, and are coupled to, an upper spring arm mounting fixture 34. This upper spring arm mounting fixture is again fastened at predetermined distances along a vibratory conveyor bed 35.

As should be understood, the vibratory motor 31, when energized, is operable to impart vibratory force so as to cause reciprocal vibratory motion of the vibratory conveyor bed 35, and which is effective for moving a given product along the vibratory conveyor bed 35. The presently designed arrangement as seen in the drawings is considered to be an excited frame vibratory conveyor which is well known in the art. However, other vibratory conveyor designs such as direct-drive conveyors would work with equal success. Still referring to FIG. 1 it will be seen that individual, vibratory isolators 40 of traditional design are employed to minimize the amount of vibratory force transmitted from the base portion of the vibratory conveyor 22, to the supporting frame 13. The vibratory conveyor bed 35 has a first intake end 41, and an opposite, second, or discharge end 42. Still further the vibratory conveyor bed has spaced, upwardly extending sidewalls 43, and further a supporting, conveying surface 44 (FIG. 2B) extends between the first and second ends 41 and 42, respectively. As illustrated in FIG. 1, releasable latches 45 are mounted on the sidewalls 43 at given locations, and is operable to releasably secure a screen or screen assembly having a given design, and which will be discussed in greater detail in the paragraphs which follow. When energized, the motor 31 causes the vibratory conveyor bed to move a product along a path of travel which is generally indicated by the numeral 46, and at a predetermined speed.

Figure 4:
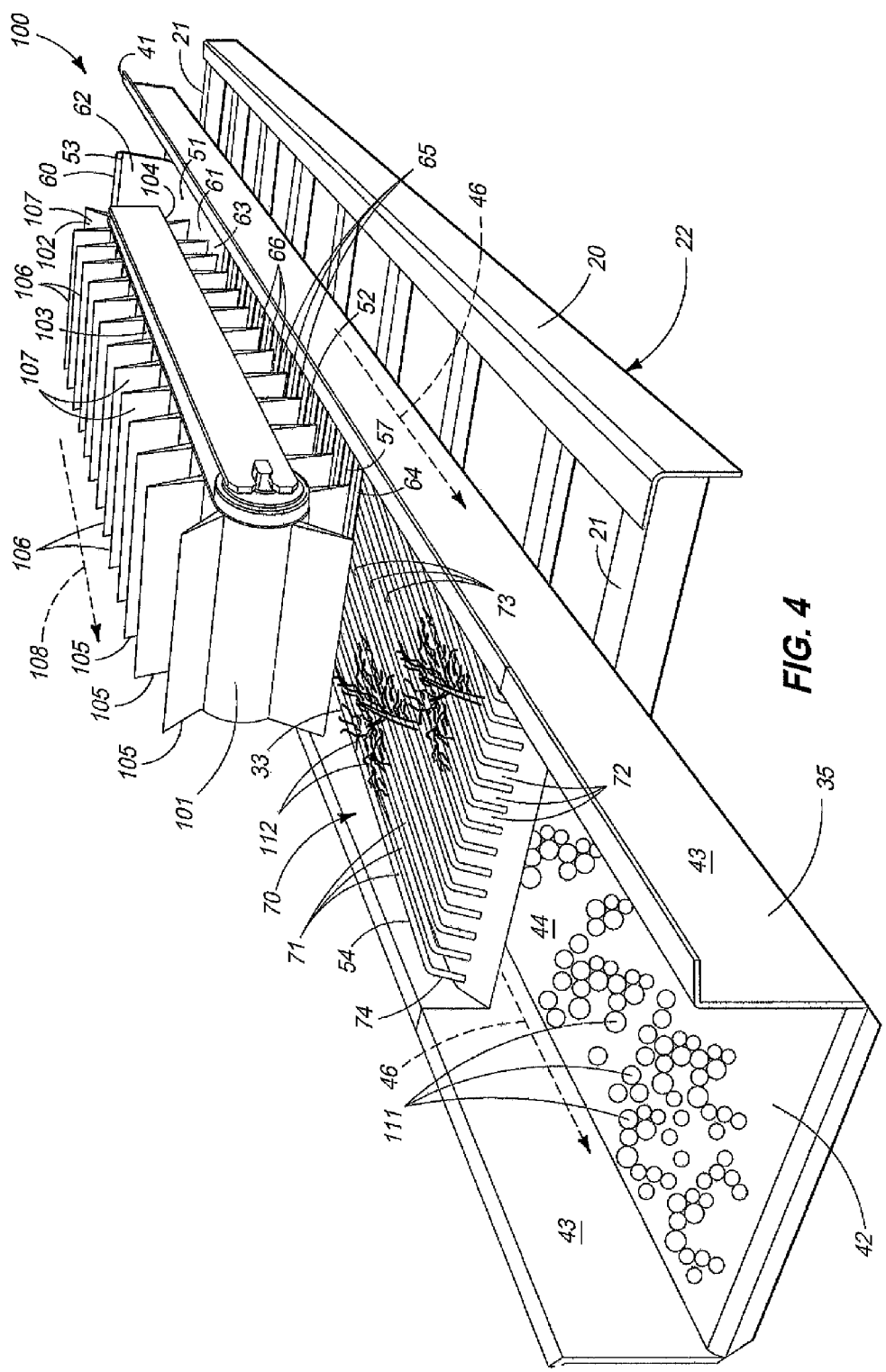
FIG. 4 is a simplified, fragmentary, perspective view of a cleated conveyor belt which is located in spaced relationship relative to a conveying surface as defined by a vibratory conveyor, both of which form features of the present invention.
Figure 6:
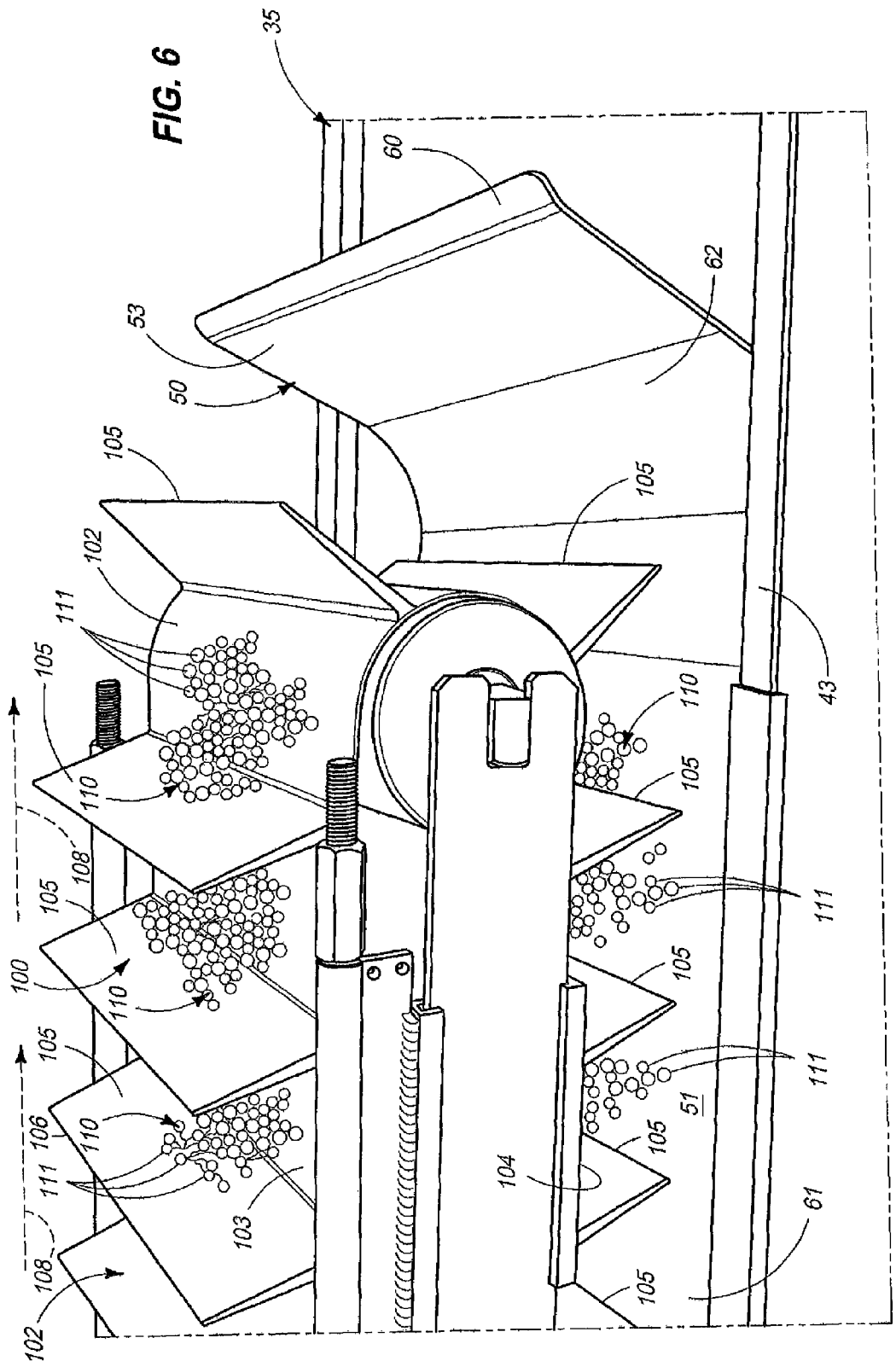
FIG. 6 is a fragmentary, side elevation view of a portion of a cleated conveyor belt which forms a feature of the present invention.
Figure 7:
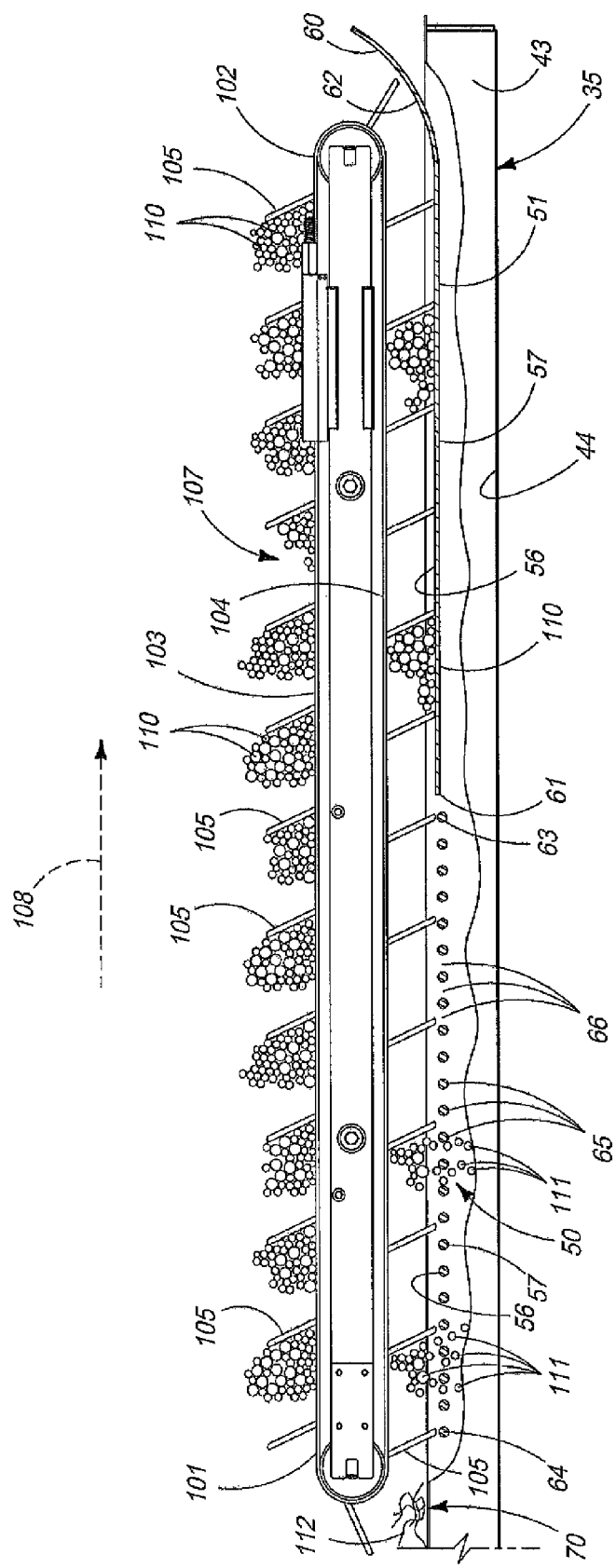
FIG. 7 is a somewhat simplified, fragmentary, side elevation view of a cleated conveyor belt, in combination with a vibratory conveyor having a supporting conveying surface, and which forms features of the present invention.

The grape processing apparatus and method of the present invention 10 further includes providing a screen assembly which is generally indicated by the numeral 50 and which is releasably mounted by way of the releasable latches 45, in a predetermined spaced relationship over the supporting, conveying surface 44 as defined by the vibratory conveyor bed 35. The screen assembly 50 includes a first portion which is indicated by the numeral 51 (FIG. 6), and a downstream, second portion 52 (FIG. 2A) which is attached to the first portion 51. The screen 50 has a first end 53, and an opposite second end 54 (FIG. 4). Still further, the screen 50 is defined by a peripheral edge 55 (FIG. 2B), and has a top surface 56, and a bottom surface 57 (FIG. 7). It should be understood that the screen assembly 50 has predetermined length and width dimensions. Similarly the vibratory conveyor bed 35 has predetermined length and width dimensions. As presently conceived, the screen assembly 50 has length and width dimensions which are typically, slightly less than those of the vibratory conveyor bed 35 which is positioned there below.

Figure 5:
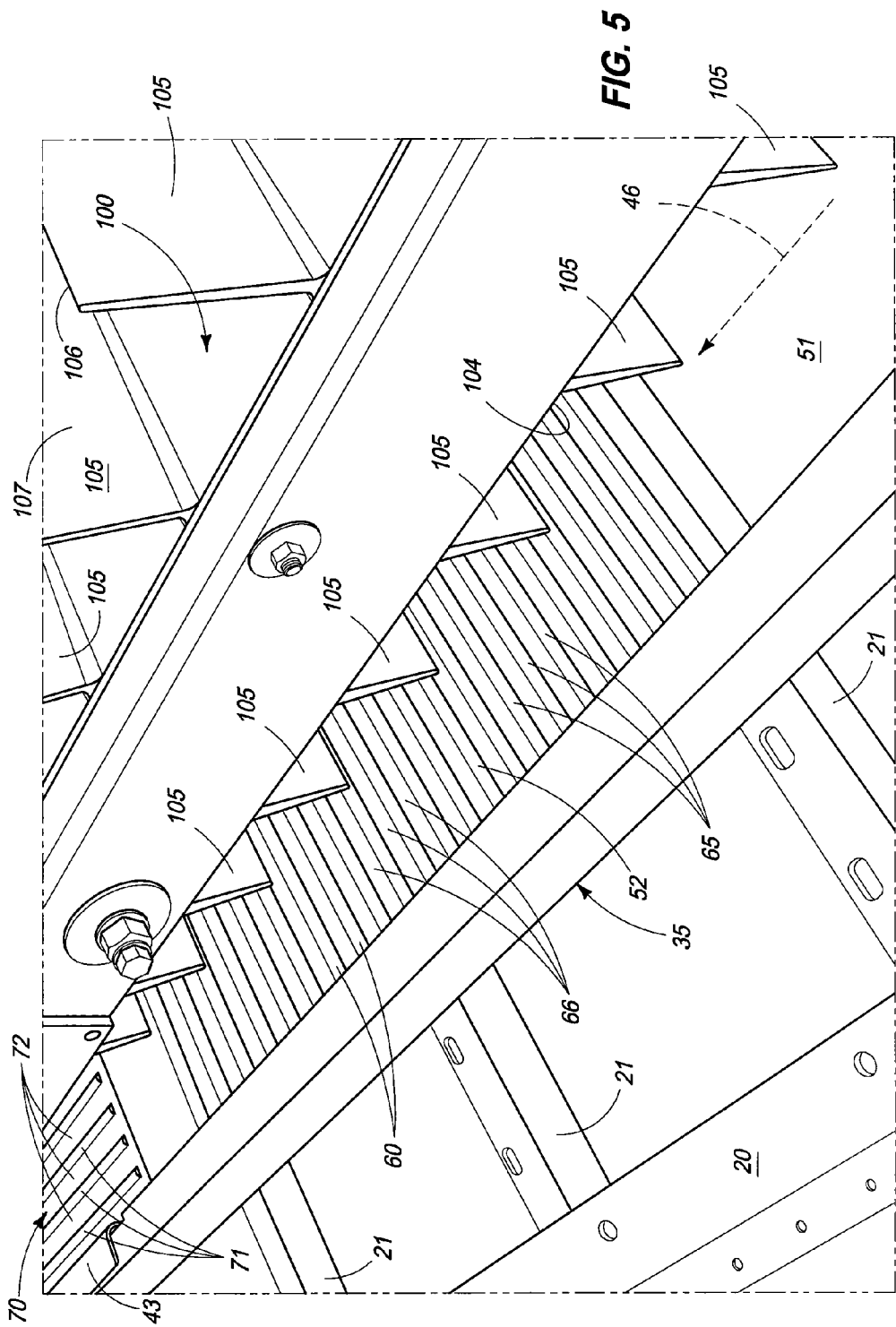
FIG. 5 is a fragmentary perspective, side elevation view of a cleated conveyor belt which overlies a screen, both of which form features of the present invention.

The first portion 51 of the screen assembly 50 has a first intake end 60 (FIG. 6), and an opposite, second end 61 (FIG. 7), which is affixed or otherwise positioned adjacent to the second portion 52 (FIG. 5). Still further the first portion 51 has an intermediate curved portion 62 and which is utilized to guide or otherwise direct individual bunches of grapes, which will be described, below, downwardly and onto or in the direction of the second end 61 of the second portion 52. Additionally, it will be seen that the second portion 52 has a first end 63 (FIG. 7) which is located adjacent to the second end 61 of the first portion, and an opposite second end 64. The second portion of the screen 50 is defined by a multiplicity of transversely disposed screen members 65 which are spaced apart to form apertures 66 of a given size therebetween. The size of these apertures 66 are greater than about one-half inches. The apertures permit individual grapes, as will be described hereinafter, to pass therethrough, and under the influence of gravity, and be received for further transportation along the path of travel 46 (FIGS. 2B and 4) as defined by the vibratory conveyor bed 35.

The screen assembly 50 includes a third portion 70, as best seen in FIG. 4. The third portion 70 is fabricated from a multiplicity of elongated, spaced, and longitudinally extending support members 71. As seen in FIG. 4 the individual longitudinally extending supporting members 71 are spaced a given distance apart and have a top surface 73. Further the third portion has a distal end 74. The third portion 70 of the screen assembly 50 is operable to support stems and material other than grapes (MOG) which have become separated from individual bundles of grapes as will be described, hereinafter, during the processing of the bundles of grapes by the present apparatus and methodology 10.

Again, referring to FIG. 1 and following, it will be seen that the grape processing apparatus and methodology 10 of the present invention includes providing a cleated conveyor belt which is generally indicated by the numeral 100, and which is positioned or located in predetermined, spaced relation, and in partial covering relation over the top of the screen or screen assembly 50 as previously described. The cleated conveyor belt 100 is flexible, and has a first intake end 101, and a second discharge end 102. The cleated conveyor belt, which is continuous, has a top flight 103, and an opposite bottom flight 104 (FIG. 7). The bottom flight 104 is located in predetermined spaced relation relative to the top surface 56 of the screen assembly 50 as previously described. This spaced distance is greater than about 4 inches. The cleated conveyor belt 100 mounts a plurality of spaced, substantially flexible cleats 105 which are oriented in a non-perpendicular relationship relative to the underlying conveyor belt. Each of the flexible cleats 105 has a distal edge 106 (FIG. 7), which is located adjacent to, and only minimally contacts the top surface of the screen assembly 50, when the cleated conveyor belt is rendered operational. The respective individual flexible cleats define individual pockets 107 which are operable to receive bunches of grapes as will be described, below, and carry the bunches of grapes along the path of travel 108 (FIG. 7) so that they may be deposited at the first intake end 60 of the first portion 51 of the screen assembly 50. Thereafter, the respective individual cleats are operable to urge or otherwise move the respective bundles of grapes in an opposite direction along the screen assembly 50 for processing as will be described in greater detail, below. The cleated conveyor belt is held in spaced relationship relative to the screen assembly 50 by means of a frame. The frame does not however co-vibrate with the vibratory conveyor as earlier described. It will be understood, however, that the screen assembly 50 is mounted on the vibratory conveyor bed 35 and therefore vibrates at approximately the same frequency as the vibratory conveyor bed 35. In the present arrangement the cleated conveyor belt 100 moves at about 3 times the rate of speed that the vibrating conveyor moves product therebelow. The combination of the speed differential, and the vibrational frequency of the vibratory conveyor 35, in combination with the vibratory screen assembly 50, separates grapes from the associates stems of the bunches of grapes which will be described, below. The singultated berries or grapes pass under the influence of gravity through the apertures 66 which are defined by the screen assembly 50, and are thereafter conveyed by the vibratory conveyor to the distal end thereof for collection.

Figure 3:
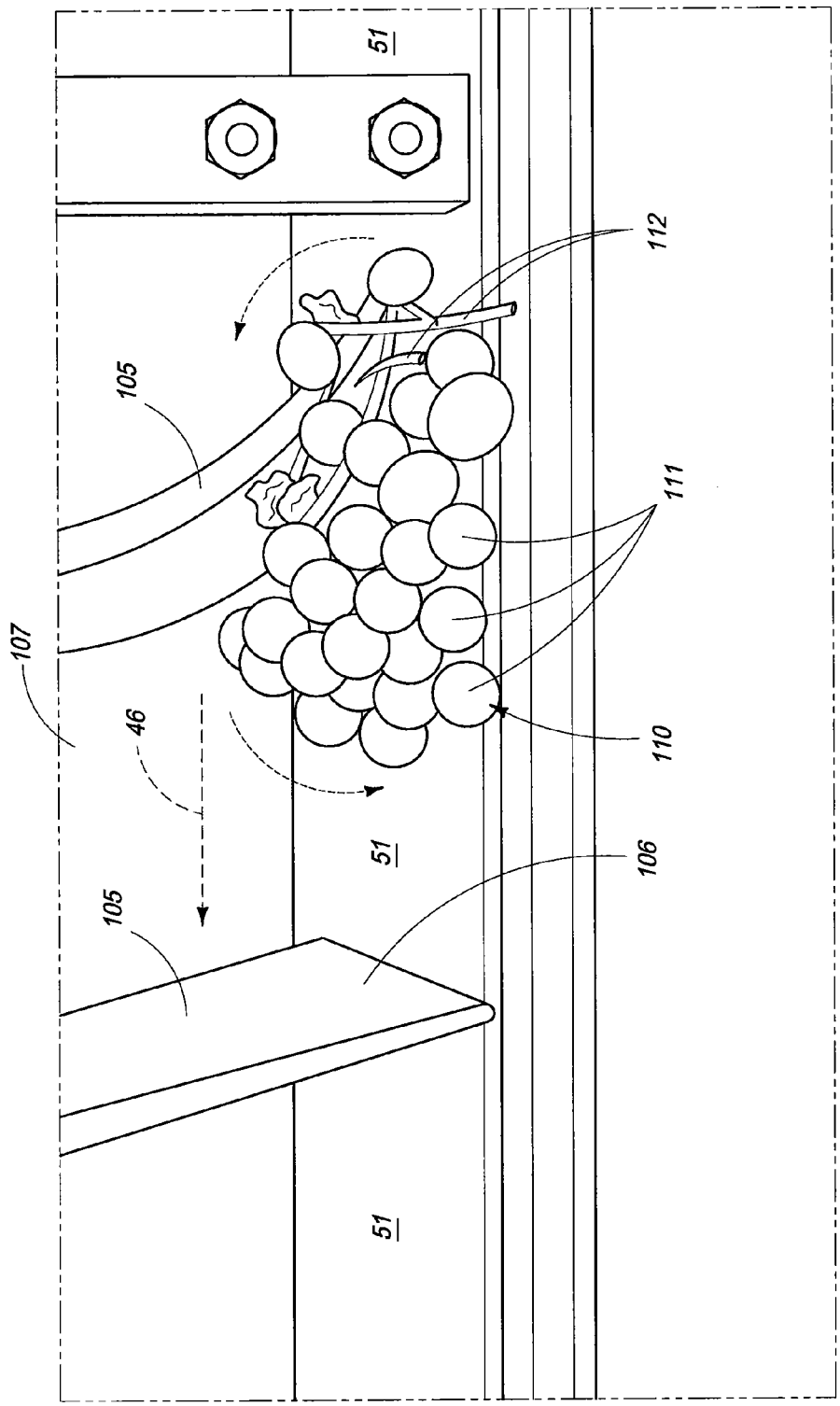
FIG. 3 is a fragmentary, greatly enlarged, side elevation view of a bunch of grapes being urged along a predetermined path of travel by the bottom flight of a cleated conveyor belt which forms a feature of the present invention.

As will be appreciated from a study of FIG. 1, and following, the grape processing apparatus and methodology is supplied with, and receives a source of bunches of grapes which are generally indicated by the numeral 110 and which are deposited on the first end 101 of the cleated conveyor belt 100. The source of bunches of grapes 110 include individual berries 111 (FIG. 6) which are still attached to the associated stems 112 (FIG. 3). The bunches of grapes 110 further have material other than grapes (MOG), and which may include dirt, harvesting debris, leaves and other materials mixed with same. The individual bunches of grapes 110 are deposited in the pockets 107 between the flexible cleats 105 and are carried to the second end 102. At the second end 102, the bunches of grapes 110 move under the influence of gravity and are deposited on the first end 60 of the first portion 51 of the screen 50. Thereafter, the flexible cleats on the bottom flight 104 forcibly engage the bunches of grapes and urge the bunches of grapes 110 along in a rolling and tumbling motion which, in combination with the reciprocal motion of the screen, and the differential speed of the cleated conveyor 100, is operable to separate the individual berries or grapes 111 from the associated stems 112. The individual berries or grapes 111 thereafter pass under the influence of gravity through the individual apertures 66 which are defined by the screen assembly 50, and then are received onto the vibratory conveyor bed 35 for transport and collection. Further, the individual stems 112, which have not been macerated or otherwise broken are passed onto the third portion 70 of the screen assembly 50 where they are thereafter collected and properly disposed of.

Operation

The operation of the described embodiment of the present invention is believed to be readily apparent, and is briefly summarized at this point.

In its broadest aspect, the present invention relates to a grape processing apparatus and methodology 10 which includes providing a screen 50 having a top surface 56, and which defines a multiplicity of apertures 66 having a given size. The present invention also includes providing a cleated conveyor belt 100 having a bottom flight 104 which is spaced a predetermined distance from the top surface 56 of the screen 50. Still further, the grape processing apparatus and methodology 10 includes supplying a source of bunches of grapes 110 having both individual grapes 111 which are attached to associated stems 112. The bunches of grapes are fed or delivered into the predetermined space defined between the bottom flight 104 of the cleated conveyor belt 100 and the screen 50. The bottom flight 100 of the cleated conveyor belt 100 moves the individual bunches of grapes 110 along the screen 50 in a rolling and tumbling action to separate the individual grapes 111 from the associated stems 112. The individual separated grapes then pass through the multiplicity of apertures 66 which are defined by the screen for collection. The separated stems 112 as seen in FIG. 4 travel on top of the screen 50 to the third portion 70 and is then removed therefrom for disposal.

The grape processing apparatus and methodology 10, as described, includes supplying a vibratory conveyor 35 having a supporting conveying surface 44 which is mounted in spaced, gravity receiving relationship relative to the screen 50. The screen 50 is releasably mounted on the vibratory conveyor and reciprocally vibrates in substantial unison with the vibratory conveyor 35. In the arrangement as described, above, the cleated continuous conveyor belt 100 is held in spaced relationship relative to the vibratory conveyor 35 by a frame. In this arrangement, the frame is substantially stationary, and is not affected by the vibratory motion of the underlying vibratory conveyor 35.

The vibratory conveyor 35 has a length and width dimension, and a first intake end 41, and a second, opposite discharge end 42. The screen 50, as earlier described, is located in at least partial covering relation over the supporting conveying surface 44 of the vibratory conveyor 35. Still further the screen 50 has a length and width dimension which is less than the length and width dimension of the underlying vibratory conveyor 35. The cleated conveyor belt 100 is continuous, and has a top flight 103 which is spaced from the bottom flight 104. The supplied source of bunches of grapes 110 are first deposited on the top flight 103, and are then carried along a given path of travel 108 for deposit in a location near to, but spaced upwardly from, the first intake end 41 of the vibratory conveyor 35. The bottom flight 104 of the cleated conveyor belt 100 forcibly engages the individual bunches of grapes and then moves the individual bunches of grapes 110 along the top surface 56 of the screen 50 in a rolling and tumbling action to facilitate the separation of the individual grapes 1'11 from the associated stems 112. The individual grapes, as earlier described, pass under the influence of gravity through the apertures 66 which are defined by the screen 50 for collection on the supporting conveying surface 44 of the vibratory conveyor 35, and for transport to the second discharge end 42 therefor. In the arrangement as seen in the drawings the cleated conveyor belt 100 has individual cleats 105 which are flexible, and which are located in a substantially non-perpendicular orientated relative to the cleated conveyor belt 100. The respective cleats 105 only minimally engage the top surface 56 of the underlying screen 50. The individual cleats are located in predetermined, spaced locations of greater than about 4 inches of separation along the cleated conveyor belt.

The bottom flight 104 of the cleated conveyor belt 100 is spaced from the top surface of the screen 50 by distance of greater than about 4 inches. The respective apertures 66 which are defined by the screen 50 have a width dimension of greater than of about one-half inches. In the arrangement as seen in the drawings, the screen 50 comprises a multiplicity of elongated, spaced, substantially transversely disposed members 65. The apertures 66 are defined between the respective elongated spaced, substantially elongated members 65. In an alternative form of the invention the screen 50 comprises a wire mesh or grating which defines a multiplicity of apertures. This second form of the invention is not shown. In the arrangement as seen in the drawings the cleated continuous conveyor belt 100 moves the individual bunches of grapes 110 to be processed at a speed of greater than amount 50 feet per minute. Still further the vibratory conveyor 35 moves the separated grapes 111 at a speed of about 50 feet per minute. As will be recognized from the drawings, the initial movement of the bunches of grape 110 on the top flight 103 of the cleated conveyor belt 100 is in a direction opposite to that which is provided by the vibratory conveyor 35. It is possible, in one form of the invention, that the initial deposit of the individual bunches of grapes 110 may be made at the first end 60 of the first portion 51 of the screen assembly 50 as opposed to what has been depicted, that being that the individual bunches of grapes are first deposited on the top flight 103 of the cleated conveyor belt 100.

Therefore it will be seen that the present invention provides a convenient means by which bunches of grapes may be processed in a manner and methodology not possible heretofore, thereby resulting in the separation of the individual grapes from the associated stem materials, and material other than grapes (MOG), so as to provide a resulting uniform grape product which may then be conveniently processed for wine production and other end uses.

In compliance with the statute, the present invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the Doctrine of Equivalents.

We claim:

1. A method for processing grapes, comprising:
   providing a screen having a top surface and which defines a multiplicity of apertures having a given size;
   providing a cleated conveyor belt having a bottom flight and which is spaced a predetermined distance from the top surface of the screen;
   supplying a source of bunches of grapes having both individual grapes which are attached to associated stems, and which is fed into the predetermined distance defined between the bottom flight of the cleated conveyor belt and the screen, and wherein the bottom flight of the cleated conveyor belt moves the individual bunches of grapes along the screen in a rolling and tumbling action to separate the individual grapes from the associated stems, and wherein the individual grapes pass through the multiplicity of apertures which are defined by the screen for collection;
   propelling the separated stems across the top surface of the screen; and removing the stems for disposal.

2. A method for processing grapes, as claimed in claim 1, and further comprising:
   providing a vibratory conveyor having a supporting, conveying surface which is mounted in spaced, gravity receiving relationship below the screen, and wherein the screen is releasably mounted on the vibratory conveyor and reciprocally vibrates in substantial unison with the vibratory conveyor.

3. A method for processing grapes as claimed in claim 2, and wherein the cleated conveyor belt is held in spaced relationship relative to the vibratory conveyor by a frame, and wherein the frame is substantially stationary.

4. A method for processing grapes as claimed in claim 3, and wherein the vibratory conveyor has a length and width dimension, and a first, intake end, and a second, opposite, discharge end, and wherein the screen is located in at least partial covering relationship over and above the supporting conveying surface of the vibratory conveyor, and further has a length, and width dimension which is less than the length and width dimension of the underlying vibratory conveyor.

5. A method for processing grapes as claimed in claim 4, and wherein the cleated conveyor belt is continuous, and has a top flight which is spaced from the bottom flight, and further comprising depositing on the top flight the bunches of grapes and carrying the bunches of grapes along a given path of travel and depositing the bunches of grapes in a location near to, but spaced upwardly from, the first intake end of the vibratory conveyor; and forcibly engaging the bunches of grapes with the bottom flight of the cleated conveyor belt so that the individual bunches of grapes move along the top surface of the screen in a rolling and tumbling action to facilitate the separation of the individual grapes from the associated stems, and wherein the individual grapes pass under the influence of gravity through the apertures defined by the screen for collection on the supporting, conveying surface of the vibratory conveyor for transport to the second, discharge end thereof.

6. A method for processing grapes as claimed in claim 5, and wherein the cleated, conveyor belt has individual cleats which are flexible, and which are located in a substantially non-perpendicular orientation relative to the cleated conveyor belt, and wherein the respective cleats do not substantially engage the top surface of the underlying screen, and wherein the individual cleats are located at predetermined, spaced locations of greater than about 4 inches of separation, along the cleated conveyor belt.

7. A method for processing grapes as claimed in claim 6, and wherein the bottom flight of the cleated conveyor belt is spaced from the top surface of the screen by a distance of greater than about 4 inches, and wherein the respective apertures which are defined by the screen have a width dimension of greater than about one-half inches.

8. A method for processing grapes as claimed in claim 7, and wherein the screen comprises a multiplicity of elongated, spaced, substantially transversely disposed members, and wherein the apertures are defined between the respective elongated, spaced, substantially elongated members.

9. A method for processing grapes as claimed in claim 7, and wherein the screen comprises a wire mesh which defines the multiplicity of apertures.

10. A method for processing grapes, comprising:
providing a vibratory conveyor having a supporting, conveying surface which reciprocates; supplying a source of harvested individual grapes to move along a given path of travel, and wherein the source of harvested individual grapes are derived from individual bunches which include both a multiplicity of individual grapes and associated stems attached to the grapes and material other than grapes (MOG);
providing a screen, defining a multiplicity of apertures, and which is mounted on the vibratory conveyor, and which is further located in spaced relationship relative to the supporting, conveying surface of the vibratory conveyor, and which additionally reciprocates in unison with the supporting conveying surface, and wherein the screen has a top surface;
providing a cleated continuous conveyor belt and locating the cleated continuous conveyor belt in spaced, at least partially covering relationship over the screen which is mounted on the vibratory conveyor, and wherein the cleated continuous conveyor belt has a top flight, and a bottom flight which is located in spaced relation relative to the top surface of the screen; first depositing the source of the harvested bunches of grapes on the top flight, and then secondly depositing the harvested bunches of grapes onto the top surface of the screen; forcibly engaging the harvested bunches of grapes deposited on the top surface of screen with the respective cleats on the bottom flight of the cleated continuous conveyor belt so as to forcibly move the harvested bunches of grapes along the top surface of the reciprocating screen in a rolling and tumbling action and which facilitates the separation of the respective grapes from the associated stems, and further causes the separated grapes to pass through the apertures defined by the screen, and be received on the supporting, conveying surface of the vibratory conveyor for transport along the path of travel for collection; and
propelling the separated stems and MOG across the top surface of the screen for collection and disposal.

11. A method for processing grapes as claimed in claim 10, and wherein the vibratory conveyor is an excited frame vibratory conveyor.

12. A method for processing grapes as claimed in claim 10, and wherein the vibratory conveyor is a direct drive vibratory conveyor.

13. A method for processing grapes as claimed in claim 10, and wherein the vibratory conveyor has a first, intake end, and a second discharge end, and wherein the top flight of the cleated, continuous conveyor belt has a first, intake end which is located adjacent to, and spaced upwardly from, the second, discharge end of the vibratory conveyor, and an opposite, second end which is located adjacent to, and above, the first intake end of the vibratory conveyor.

14. A method for processing grapes as claimed in claim 13, and further comprising carrying the individual bunches of grapes with the top flight in a first path of travel which is opposite to the path of travel that the separated grapes travel when transported by the vibratory conveyor, and wherein the respective cleats on the bottom flight move the harvested grapes in a second path of travel over the top of the screen and in a direction which is opposite to that which is defined by the top flight, and in the same direction as the path of travel which is defined by the vibratory conveyor.

15. A method for processing grapes as claimed in claim 10, and wherein the cleated, continuous conveyor belt has individual cleats which are located in a substantially non-perpendicular orientation.

16. A method for processing grapes as claimed in claim 10, and wherein the cleated, continuous conveyor belt has individual cleats which are flexible, and which do not substantially engage the top surface of the screen.

17. A method for processing grapes as claimed in claim 10, and wherein the bottom flight is spaced at a distance greater then about 4 inches above the top surface of the screen, and which permits the individual bunches of grapes to roll and tumble along the top surface of the screen.

18. A method for processing grapes as claimed in claim 10, and wherein the multiplicity of apertures formed by the screen have a width dimension of greater than about one-half inches, and which permits individual grapes to pass therethrough, and fall under the influence of gravity onto the supporting conveying surface which is defined by the vibratory conveyor.

19. A method for processing grapes as claimed in claim 10, and wherein the cleated continuous conveyor belt moves the individual bunches of grapes to be processed at a speed of greater than about 50 feet per minute, and wherein the vibratory conveyor moves the separated grapes at a speed of greater than about 50 feet per minute.

20. A method for processing grapes as claimed in claim 10, and wherein the screen is releasably mounted onto the vibratory conveyor so that the screen may be removed for cleaning.

21. A method for processing grapes as claimed in claim 10, and wherein the vibratory conveyor has a given length and width dimension, and wherein the screen has a length and width dimension which is less than the length and width dimension of the vibratory conveyor.

22. A method for processing grapes as claimed in claim 10, and wherein the cleated continuous conveyor belt is mounted in an operational orientation above the top surface of the screen but does not co-vibrate with the vibratory conveyor.

23. A method for processing grapes as claimed in claim 10, and wherein the screen comprises a multiplicity of elongated, spaced, substantially transversely disposed members, and wherein the apertures are defined between the respective elongated, spaced members.

24. A method for processing grapes as claimed in claim 10, and wherein the screen comprises a wire mesh which defines the multiplicity of apertures.

25. A method for processing grapes comprising:
providing a vibratory conveyor having a conveyor bed for receiving and transporting a multiplicity of individual grapes;
energizing the vibratory conveyor so as to impart vibratory motion to the conveyor bed, and cause a resulting motion of the individual grapes, and wherein the conveyor bed has a first, intake end, and a second, discharge end, and wherein individual grapes deposited on the conveyor bed of the vibratory conveyor, under the influence of the vibratory motion imparted by the vibratory conveyor bed, travel in a predetermined direction of movement from the first intake end, to the second discharge end;
providing a screen having a top surface, and mounting the screen on the vibratory conveyor, and above the conveyor bed, and wherein the screen defines a multiplicity of apertures each having a size which will permit the individual grapes to pass therethrough, and wherein the screen includes a first end which is disposed in spaced relation, and elevationally above the first, intake end of the vibratory conveyor bed, and a second end which is located in spaced relation, and elevationally above the second, discharge end of the vibratory conveyor bed, and wherein the screen co-vibrates with the vibratory conveyor;
providing a cleated and continuous conveyor belt, and mounting the cleated and continuous conveyor belt above the screen, and wherein the cleated and continuous conveyor belt has a top flight, and a bottom flight, and wherein a plurality of outwardly extending cleats are mounted in predetermined spaced relation on, and along, the respective top and bottom flights, and wherein the bottom flight of the cleated, and continuous conveyor belt is spaced a predetermined distance from the top surface of the screen and thereby forms a predetermined space between the bottom flight of the cleated, and continuous conveyor belt, and the top surface of the screen;
energizing the cleated, and continuous conveyor belt so as to cause the top flight of the cleated, and continuous conveyor belt to move in a direction which is opposite to the direction of movement of the individual grapes which are traveling along the conveyor bed of the vibratory conveyor, and wherein the bottom flight of the cleated, and continuous conveyor belt moves in a direction which is similar to, and parallel with the direction of movement of the individual grapes which are traveling along the conveyor bed of the vibratory conveyor;
supplying a source of individual bunches of grapes which include individual stems which support, and have attached thereto, individual grapes, and which further include material other than grapes (MOG);
depositing the individual bunches of grapes on the top flight, and then transporting the individual bunches of grapes on the top flight of the cleated, and continuous conveyor belt, and depositing the individual bunches of grapes on the first end of the screen;
engaging the bunches of grapes with the respective cleats of the bottom flight of the cleated, and continuous conveyor belt, and forcibly moving the respective bunches of deposited grapes through, and along, the predetermined space which is defined between the top of the screen, and the bottom flight of the cleated and continuous conveyor belt from the first end of the screen, and toward the second end of the screen, and wherein the plurality of cleats of the bottom flight of the cleated and continuous conveyor belt, along with the vibratory motion of the screen, imparts a resulting tumbling action to the respective bunches of grapes passing along, and through the predetermined space so as to facilitate a separation of the individual grapes from the stems and MOG, and wherein the separated individual grapes pass, under the influence of gravity, through the individual apertures defined by the screen, and drop onto the conveyor bed of the vibratory conveyor, and wherein the stems and MOG, which have become separated from the individual grapes, remain on the top surface of the screen; and
propelling the separated stems and MOG which are resting on the top surface of the screen toward the second end of the screen, and in the same direction of travel as the individual grapes which have been deposited on the conveying bed of the vibratory conveyor.

* * * * *